(12) United States Patent
Walker

(10) Patent No.: US 8,712,364 B2
(45) Date of Patent: Apr. 29, 2014

(54) IN-VEHICLE COMMUNICATION SYSTEM AND METHOD OF OPERATION

(71) Applicant: Delphi Technologies, Inc., Troy, MI (US)

(72) Inventor: Glenn A. Walker, Greentown, IN (US)

(73) Assignee: Delphi Technologies, Inc., Troy, MI (US)

( * ) Notice: Subject to any disclaimer, the term of this patent is extended or adjusted under 35 U.S.C. 154(b) by 1 day.

(21) Appl. No.: 13/621,960

(22) Filed: Sep. 18, 2012

(65) Prior Publication Data

US 2014/0080438 A1 Mar. 20, 2014

(51) Int. Cl.
*H04B 1/16* (2006.01)

(52) U.S. Cl.
USPC ...................................... 455/343.3; 455/343.4

(58) Field of Classification Search
USPC ................ 455/230, 231, 343.1, 343.2, 343.3, 455/343.4, 345; 340/5.72
See application file for complete search history.

(56) References Cited

U.S. PATENT DOCUMENTS

| | | | |
|---|---|---|---|
| 5,140,698 A | 8/1992 | Toko | |
| 5,241,542 A * | 8/1993 | Natarajan et al. | 370/311 |
| 6,236,850 B1 * | 5/2001 | Desai | 455/343.2 |
| 7,262,684 B2 | 8/2007 | Conner et al. | |
| 7,593,711 B2 | 9/2009 | Romano et al. | |
| 7,903,601 B2 | 3/2011 | Voglewede et al. | |
| 2005/0048929 A1 * | 3/2005 | Ogino | 455/90.1 |
| 2005/0143146 A1 | 6/2005 | Kim | |
| 2007/0139150 A1 | 6/2007 | Chow et al. | |
| 2010/0003940 A1 * | 1/2010 | Sanji et al. | 455/254 |
| 2011/0098015 A1 | 4/2011 | Goodwin et al. | |
| 2012/0147800 A1 | 6/2012 | Park et al. | |

* cited by examiner

*Primary Examiner* — Nguyen Vo
(74) *Attorney, Agent, or Firm* — Lawrence D. Hazelton

(57) ABSTRACT

An in-vehicle communication system configured to receive signals from a transmitter configured to transmit periodically a time-reference signal and receiver specific information. An information transmission time of receiver specific information is timed relative to a reference transmission time of the time-reference signal. The system includes a receiver characterized as having a receiver identification value. The receiver is configured to operate from an off-state to an on-state during an information-expected time interval to receive receiver specific information. The information-expected time interval is determined based on a reception time of the time-reference signal and the receiver identification value. This provides a way to ensure that the transmitter only transmits messages when it knows the intended receiver is on. It also ensures that the receiver is on only when messages that for that receiver are expected to be received.

15 Claims, 3 Drawing Sheets

IN-VEHICLE COMMUNICATION SYSTEM AND METHOD OF OPERATION

TECHNICAL FIELD OF INVENTION

This disclosure generally relates to in-vehicle communication system, and more particularly relates to periodically activating a receiver in the system at times when receiver specific information is available to be received.

BACKGROUND OF INVENTION

In-vehicle communication systems such as ON-STAR® are known. Such communications are useful, for example, to send an 'unlock door' signal from a service provider to the vehicle if the owner/operator of the vehicle inadvertently locks the vehicle keys within the vehicle. Such in-vehicle communication systems may also be queried to send a vehicle report to inform the owner about vehicle maintenance issues such as the remaining life of the engine oil, or the present pressure in each of the tires. If a receiver in the vehicle is always on so that all vehicle specific information or messages are received, the receiver may draw too much power from the vehicle battery, especially if the vehicle is parked for long periods of time.

SUMMARY OF THE INVENTION

Described herein is a system and method for operating a receiver of an in-vehicle communications system that periodically turns the receiver on when receiver specific information is expected to be available for reception, and turns the receiver off when possible to conserve battery power.

In accordance with one embodiment, an in-vehicle communication system is provided. The system is configured to receive signals from a transmitter. The transmitter is configured to transmit periodically a time-reference signal and receiver specific information. An information transmission time of receiver specific information is timed relative to a reference transmission time of the time-reference signal. The system includes a receiver. The receiver is characterized as having a receiver identification value. The receiver is configured to operate from an off-state to an on-state during an information-expected time interval to receive receiver specific information. The information-expected time interval is determined based on a reception time of the time-reference signal and the receiver identification value.

In another embodiment, a method of operating an in-vehicle communication system is provided. The system is configured to receive signals from a transmitter. The transmitter is configured to transmit periodically a time-reference signal and receiver specific information. An information transmission time of receiver specific information is timed relative to a reference transmission time of the time-reference signal. The method includes the step of determining a receiver identification value of a receiver of the system. The method also includes the step of operating the receiver to detect the time-reference signal. The method also includes the step of operating the receiver from an off-state to an on-state during an information-expected time interval to receive receiver specific information. The information-expected time interval is determined based on a reception time of the time-reference signal and the receiver identification value.

Further features and advantages will appear more clearly on a reading of the following detailed description of the preferred embodiment, which is given by way of non-limiting example only and with reference to the accompanying drawings.

BRIEF DESCRIPTION OF DRAWINGS

The present invention will now be described, by way of example with reference to the accompanying drawings, in which.

DETAILED DESCRIPTION

Figure 1:
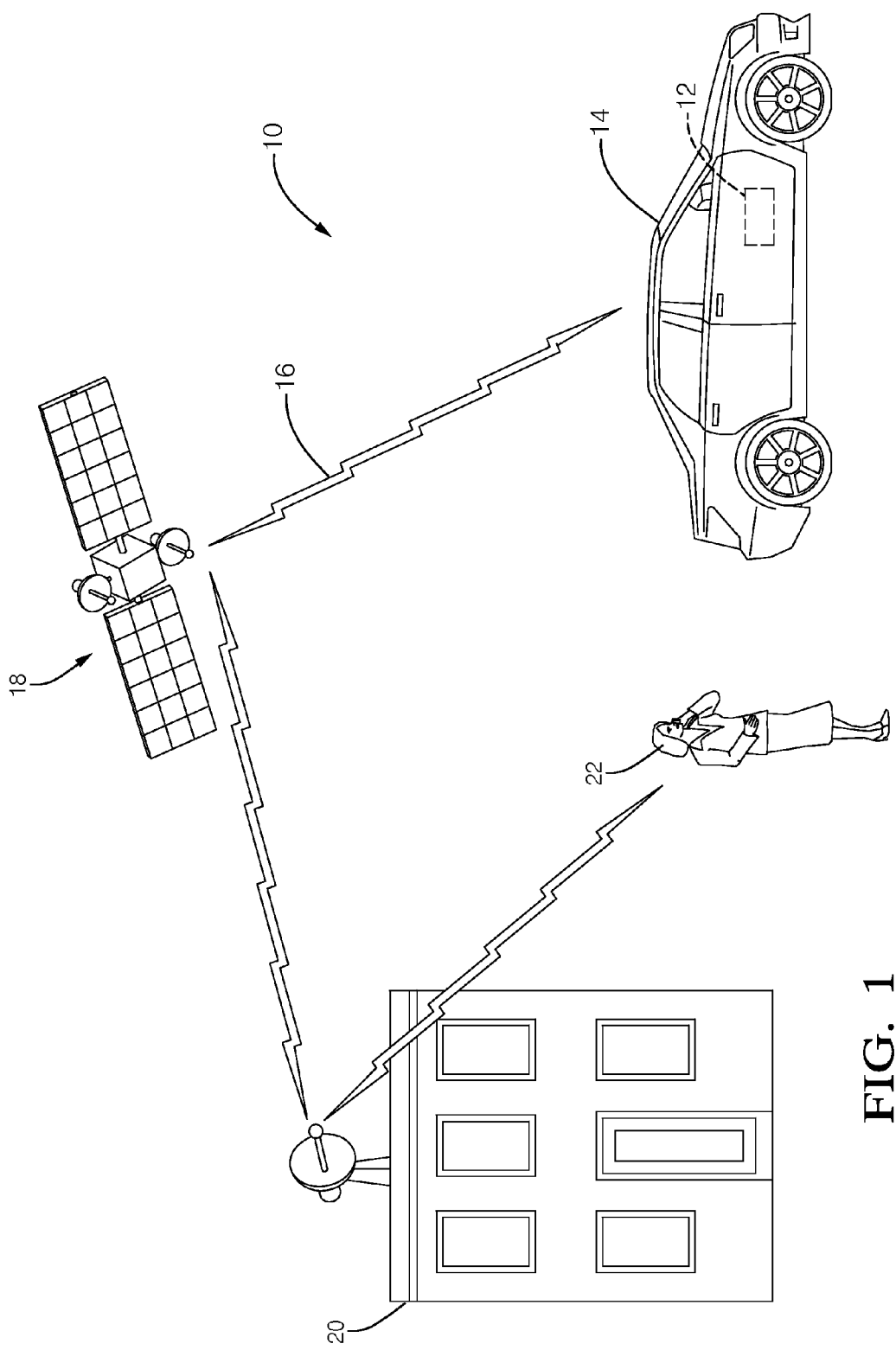
FIG. 1 is a diagram of an in-vehicle communication system in accordance with one embodiment.

FIG. 1 illustrates a non-limiting example of an in-vehicle communication system, hereafter the system 10. The system 10 may include a receiver 12 installed in a vehicle 14. The receiver 12 may be coupled to a communication buss (not shown) of the vehicle 14 so that signals 16 from a transmitter 18 can be received to, for example, unlock the doors of the vehicle 14. By way of example and not limitation, the transmitter 18 may be a satellite configured to receive communications from a ground station 20 that, in response to a phone call from the vehicle owner 22, uplinks receiver specific information to the transmitter 18 for generating the signals 16 that include the receiver specific information for the receiver 12. In general, the receiver 12 is characterized as having a receiver identification value that may uniquely identify the receiver relative to any other receiver receiving the signals 16, or may identify the receiver 12 as one of a particular collection of receivers that may react similarly to the receiver specific information communicated by the signals 16.

Figure 2:
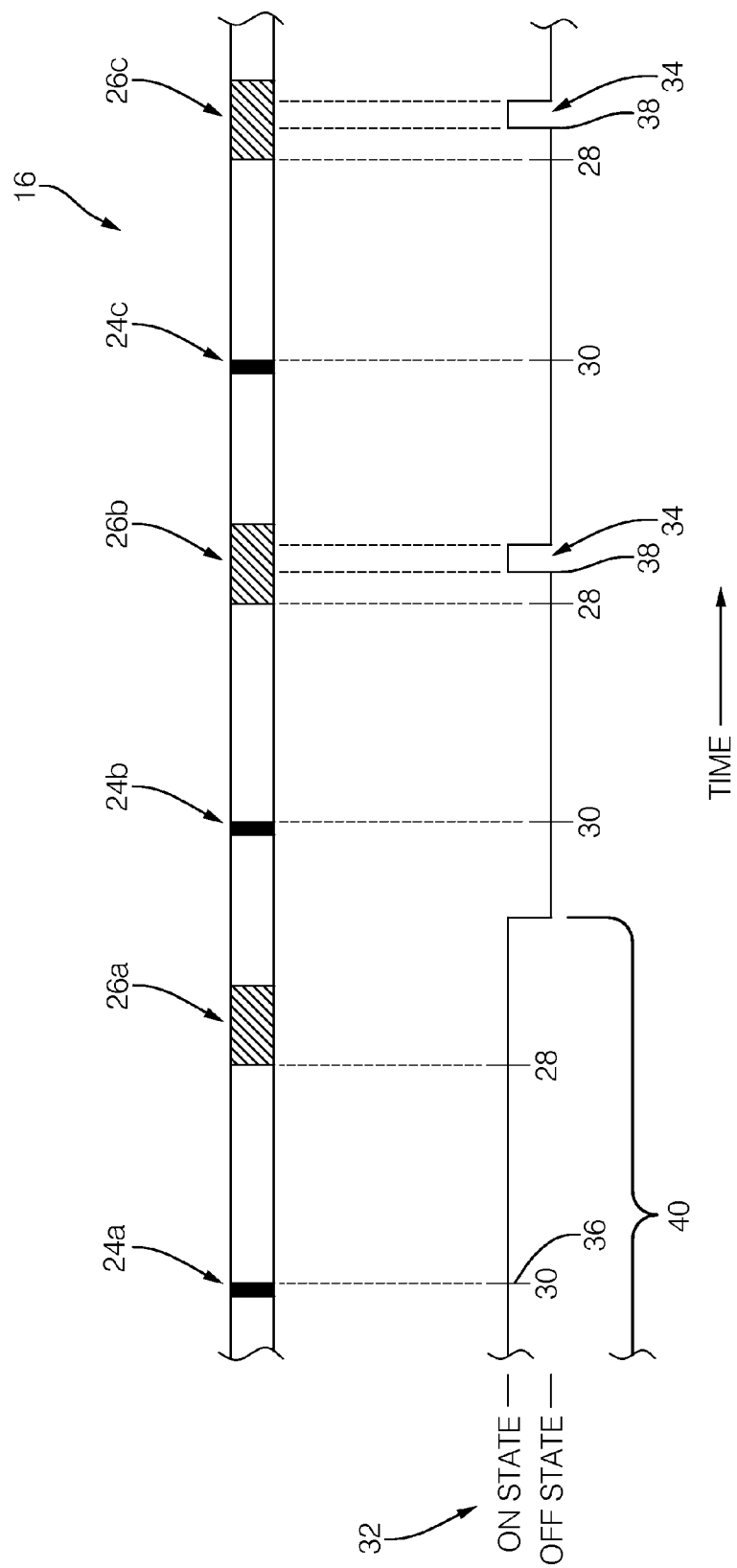
FIG. 2 is a timing diagram of signals present in the system of FIG. 1 in accordance with one embodiment.

By way of example and not limitation, the receiver identification value may be related to the vehicle identification number (VIN) of the vehicle 14, or may be related to a manufacturing serial number assigned to the receiver 12, or may be a combination thereof. The receiver 12 may include a tuner, demodulator, or other circuitry known in the art for receiving and processing the signals 16, such as radio frequency (RF) signals. The receiver 12 may include a processor (not shown) such as a microprocessor or other control circuitry as should be evident to those in the art. The receiver 12 may include memory, including non-volatile memory, such as electrically erasable programmable read-only memory (EEPROM) for storing one or more routines, thresholds and captured data. The one or more routines may be executed by the processor to perform steps for determining signals received by the receiver 12 as described herein FIG. 2 illustrates a non-limiting example of information communicated in time slots of the signals 16 transmitted by the transmitter 18. The signals 16 may include a time reference signal 24 (e.g. 24a, 24b, 24c) and receiver specific information 26 (e.g. 26a, 26b, 26c) that are periodically transmitted. The time reference signal 24 may be based on Coordinated Universal Time (UTC) signal received by the transmitter 18. The receiver specific information 26 may include messages for other receivers (not shown) as well as a message specifically for the receiver 12. For the purpose of explanation and not limitation, FIG. 2 illustrates an information transmission time 28 that generally marks the beginning of when the receiver specific information 26 is transmitted, and a reference transmission time 30 that generally marks the end of the time reference signal 24. It is appreciated that, for example, the reference transmission time 30 could mark the beginning of the time reference signal 24. As used herein, describing the time reference signal 24 as being transmitted periodically means that the time interval between the time reference signal 24a and the time reference signal 24b is essentially equal to the time interval between the time reference signal 24b and the time reference signal 24c. As such, successive marks for the reference transmission time 30 are equally spaced over time. Similarly, the marks for the information transmission time 28 are equally spaced, and so the time interval between the reference transmission time 30 and the information transmission time 28 that immediately follows is essentially constant.

FIG. 2 further illustrates a non-limiting example of a receiver activation schedule 32 for the receiver 12. In general, the receiver 12 is configured to operate from an off-state to an on-state during an information-expected time interval 34 effective to receive all or part of the receive receiver specific information 26. It should be recognized that all of the receiver specific information 26 transmitted by the transmitter 18 may not be relevant to the receiver 12, and so the receiver activation schedule 32 is determined so that the receiver 12 is activated (i.e. powered on) only when information relevant to the receiver 12 is expected to be available for reception. As such, as will be explained in more detail below, the information-expected time interval 34 may be determined based on a reception time 36 of the time reference signal 24 (i.e. the reference transmission time 30) and the receiver identification value. The receiver identification value may be used to determine when a start time 38 based on when the information-expected time interval 34 will begin.

By way of example and not limitation, part of the receiver identification value, the last eight (8) bits for example, may be used to determine the start time 38 relative to the reception time 36. Then, the receiver 12 can turn on at a time when relevant information is expected, and otherwise turned off to save battery power. It should be recognized that the timing offset duration would be 'known' to both the receiver 12 and transmitter 18. By way of further example, if the last 8 bits are used, the receiver specific information 26 (26a, 26b, or 26c) may be divided into two hundred fifty six (256) distinct time slots. The receiver 12 then can turn on, for example, two (2) seconds every five hundred twelve (512) seconds or receiver specific information. The exact 2 seconds that the receiver 12 is on the on-state would be determined an offset duration relative to the reception time 36. This enables the receiver to be off 99.6% of the time while still being able to receive messages intended for it. The transmitter 18 only needs to transmit to the receiver 12 during the information-expected time interval 34. This improves the number of receivers that can be serviced in a broadcast system. At the end of the information-expected time interval 34, the receiver 12 operates from the on-state to the off-state.

If the receiver 12 has not detected the reception time 36 of the time reference signal 24, the receiver 12 may operate to the on-state for a synchronization time interval 40 to receive the time reference signal 24. The maximum time of the synchronization time interval 40 would depend on how often the time reference signal 24 was transmitted, and how many instances of the time reference signal 24 the receiver 12 would attempt to determine the reception time 36 before stopping because, for example, the vehicle 14 was parked at a location where the signals 16 could not be received. Once the receiver 12 has determined the reception time 36, then an internal timer (not shown) within the receiver 12 may be relied upon to activate the receiver 12 during a subsequent plurality of information-expected time intervals 34 without having to determine the reference transmission time 30 immediately prior to determining every instance of the start time 38. As such, the receiver 12 may be configured to operate repeatedly only during the information-expected time interval 34 after an initial synchronization time interval 40, and before a subsequent synchronization time interval (not shown). In other words, once a time reference signal 24 is received, the receiver 12 can use an internal clock to receive multiple instances of receiver-specific information 26 before having to re-synchronize to the time reference signal 24.

It is anticipated that the internal clock of the receiver 12 and the clock used to determine when the time reference signal 24 is transmitted may drift relative to each other, and so after activating the receiver 12 only during the information-expected time interval 34, the receiver 12 may need to resynchronize with the transmitter 18. Since the receiver 12 has some prior 'knowledge' of when a time reference signal may occur, the synchronization time interval 40 used initially by the receiver 12 may be longer than a subsequent synchronization time interval (not shown). The determination of when a subsequent synchronization time interval should be performed may be decided based on several factors.

In one embodiment, the receiver may be configured to operate repeatedly only during the information-expected time interval 34 a predetermined number of instances before the subsequent synchronization time interval. Such a strategy could be based on an expected worst case tolerance stack of the difference between the internal clock of the receiver 12, and the time based used by the transmitter 18.

In another embodiment, the receiver 12 may be configured to operate repeatedly only during the information-expected time interval 34 until a time-shift difference between the information-expected time interval 34 and an information-arrival time interval (not shown, but understood to be the actual arrival time) is greater than a time-shift threshold. It is anticipate that the information-expected time interval 34 will be greater than the actual time interval that a message for the specific receiver to allow time for the receiver 12 to synchronize with the signals 16. If the message for the specific receiver arrives at an incremental amount of time different from expected, that difference can be used to determine that a subsequent synchronization should be performed.

In another embodiment, the receiver 12 may be configured to operate repeatedly only during the information-expected time interval 34 if a signal strength during the information-expected time interval 34 is greater than a signal-strength threshold. If the signal strength is too low because, for example, the vehicle is parked in an underground structure, then the receiver may stop any further attempt to detect the signals 16 until, for example, the vehicle 14 is started.

Figure 3:
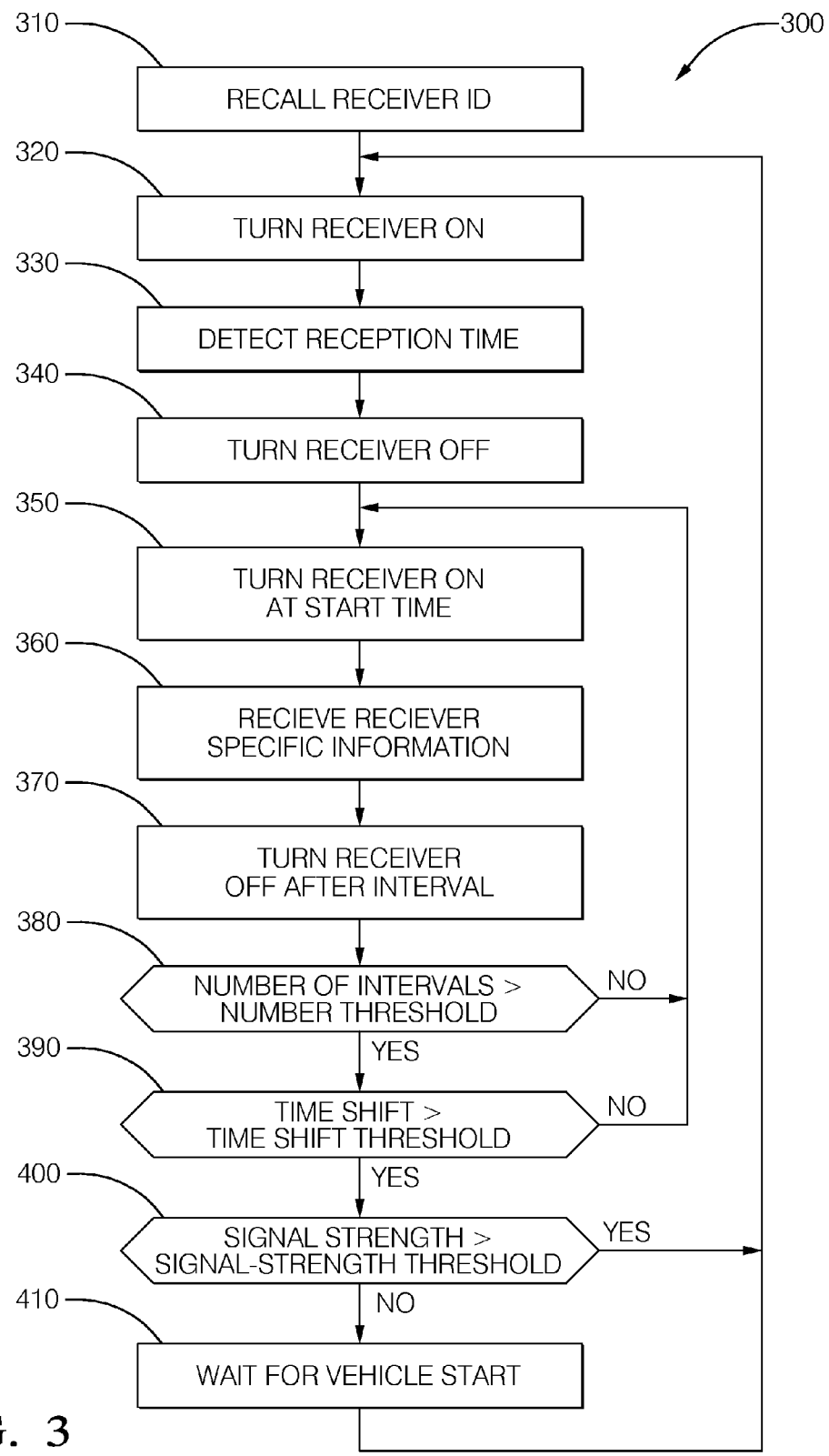
FIG. 3 is a flowchart of steps performed by the system of FIG. 1 in accordance with one embodiment.

FIG. 3 illustrates a non-limiting example of a method 300 of operating an in-vehicle communication system (the system 10). In general, the system 10 is configured to receive signals 16 from a transmitter configured 18 to transmit periodically a time reference signal 24 and receiver specific information 26. An information transmission time 28 of receiver specific information is timed relative to a reference transmission time 30 of the time reference signal 24. In general, the method 300 is such that the receiver 12 is operated to an on-state (i.e. activated or powered on) only often enough to keep track of a reception time 36 when the time reference signal 24 is expected to be received, and to receive information directed to the receiver 12 during the information-expected time interval 34.

Step 310, RECALL RECEIVER ID, may include the receiver 12 determining a receiver identification value of the receiver 12, for example, recalling the receiver identification value from memory (not shown) in the receiver 12.

Step 320, TURN RECEIVER ON, may include operating the receiver 12 to the on-state in preparation for detecting the time reference signal 24.

Step 330, DETECT RECEPTION TIME, may include operating the receiver to detect the time reference signal 24 in order to determine the reception time 36. If there is no prior history of receiving the time reference signal 24 (i.e. the receiver 12 has no basis for estimating when the time reference signal 24 may be received), then the receiver 12 may stay on an extended period of time, for example a few minutes, in order to be sure that a time reference signal 24 has been transmitted by the transmitter 18. If there is prior history of receiving the time reference signal 24, then the receiver 12 may wait until a few seconds before when a time reference signal 24 is expected to be received, and then momentarily (e.g. a few seconds) activate the receiver to detect the time reference signal 24 in order to determine the reception time 36.

Step 340, TURN RECEIVER OFF, may include operating the receiver 12 to the off-state immediately after receiving the time reference signal 24, i.e. immediately after the reception time 36. Alternatively, as suggested in FIG. 2, the receiver 12 may remain in the on-state until after the receiver specific information 26a is received. Receiving the receiver specific information 26a may be advantageous to initialize the receiver 12 if some provision for changing the formatting of the receiver specific information 26 is desired.

Step 350, TURN RECEIVER ON AT START TIME, may include operating the receiver 12 from an off-state to an on-state at the start time 38 so the receiver 12 is ready to receive the signals 16 during an information-expected time interval 34 to receive all or part of the receiver specific information 26. The start time 38 may be determined based on a reception time 36 of the time reference signal 24 and the receiver identification value. In one embodiment, the step of operating the receiver 12 from an off-state to an on-state during an information-expected time interval 34 may be repeated a plurality of instances before repeating the step of operating the receiver to detect the time reference signal 24. Steps 370, 380, and 390 are optional steps that describe tests that may be performed to determine if the receiver 12 needs to be re-synchronized to the transmitter 18.

Step 360, RECEIVE RECEIVER SPECIFIC INFORMATION, may include demodulating the signals 16 in order to extract the receiver specific information 26, and may include the receiver outputting a signal to a vehicle communication buss in order to, for example, unlock the vehicle doors.

Step 370, TURN RECEIVER OFF AFTER INTERVAL, may include operating the receiver 12 from the on-state to the off-state after the information-expected time interval 34.

Step 380, NUMBER OF INTERVALS>NUMBER THRESHOLD, may include the receiver 12 counting the number of times the receiver 12 is activated during the information-expected time interval 34 without determining a reception time 36. If NO, the method 300 returns to Step 350 to operate the receiver 12 to the on-state during the information-expected time interval 34. As such, Step 350 is repeated a predetermined number of instances. If YES, the method 300 may execute other steps, or may alternatively return to Step 320 in order to re-synchronize the receiver 12 and the transmitter 18 by executing Step 330.

Step 390, TIME SHIFT>TIME SHIFT THRESHOLD, may include determining if the difference between an internal clock of the receiver 12 and an external clock of the transmitter 18 differ by an amount greater than a time-shift threshold. If NO, the method 300 may return to step 350. As such, step of operating the receiver 12 from an off-state to an on-state during an information-expected time interval to receive receiver specific information is repeated until a time-shift difference between the information-expected time interval and an information-arrival time interval is greater than a time-shift threshold.

Step 400, SIGNAL STRENGTH>SIGNAL-STRENGTH THRESHOLD, may include determining if a signal strength of the signals 16 is greater than a signal-strength threshold. If YES, the method 300 goes to Step 320 to resynchronize the receiver 12 to the transmitter 18. If NO, then method may proceed to Step 410.

Step 410, WAIT FOR VEHICLE START, may include keeping the receiver 12 in an off-state for an extended period of time (e.g. an hour), or until the vehicle is restarted. This will help prevent unnecessary power draining on the vehicle battery if the vehicle is parked at location where the signals 16 are not receivable.

Accordingly, an in-vehicle communication system 10 and a method 300 of operating an in-vehicle communication system is provided. By using the VIN or unique receiver ID number, a subset can be created based on a modulo version of that number. I.e if 256 values are desired in a subset, only 8 bits of the digitized VIN/ID is needed. These bits are known at the receiver 12 and transmitter 18. Unique transmission times are sliced into the same amount as the subset (i.e. 256) and both the receiver and transmitter are pre-determined on what time they will transmit/receive. The offset time for each slice is based on a known time that is transmitted by the broadcast system and is known by the receiver 12, or a close estimate can be calculated. This provides a way to ensure the transmitter only transmits messages when it knows the intended receiver is on. It also ensures that the receiver is on only when messages for the receiver are expected to be received.

While this invention has been described in terms of the preferred embodiments thereof, it is not intended to be so limited, but rather only to the extent set forth in the claims that follow.

I claim:

1. An in-vehicle communication system configured to receive signals from a transmitter configured to transmit periodically a time-reference signal and receiver specific information, wherein an information transmission time of receiver specific information is timed relative to a reference transmission time of the time-reference signal, said system comprising:

a receiver characterized as having a receiver identification value, said receiver configured to operate from an off-state to an on-state during an information-expected time interval to receive receiver specific information, wherein the information-expected time interval is determined based on a reception time of the time-reference signal and the receiver identification value, wherein the receiver is configured to operate during a synchronization time interval to receive the time-reference signal, and operate during the information-expected time interval to receive receiver-specific information, wherein the receiver is configured to operate repeatedly only during the information-expected time interval after an initial synchronization time interval, and before a subsequent synchronization time interval, wherein the initial synchronization time interval is longer than the subsequent synchronization time interval.

2. The system in accordance with claim 1, wherein the receiver is further configured to operate from the on-state to the off-state after the information-expected time interval.

3. The system in accordance with claim 1, wherein the information-expected time interval is a portion of the time interval when receiver specific information is available for reception.

4. The system in accordance with claim 1, wherein the information-expected time interval is based on the reception time and a portion of the receiver identification value.

5. The system in accordance with claim 1, wherein the receiver identification value is unique to the receiver.

6. The system in accordance with claim 1, wherein the receiver identification value is based on a vehicle identification number (VIN) of the vehicle in which the receiver is installed.

7. The system in accordance with claim 1, wherein the receiver specific information includes an unlock-vehicle-doors command.

8. The system in accordance with claim 1, wherein the receiver is configured to operate repeatedly only during the information-expected time interval a predetermined number of instances before the subsequent synchronization time interval.

9. The system in accordance with claim 1, wherein the receiver is configured to operate repeatedly only during the information-expected time interval until a time-shift difference between the information-expected time interval and an information-arrival time interval is greater than a time-shift threshold.

10. The system in accordance with claim 1, wherein the receiver is configured to operate repeatedly only during the information-expected time interval if a signal strength during the information-expected time interval is greater than a signal-strength threshold.

11. A method of operating an in-vehicle communication system configured to receive signals from a transmitter configured to transmit periodically a time-reference signal and receiver specific information, wherein an information transmission time of receiver specific information is timed relative to a reference transmission time of the time-reference signal, said method comprising:
    determining a receiver identification value of a receiver of the system;
    operating the receiver to detect the time-reference signal; and
    operating the receiver from an off-state to an on-state during an information-expected time interval to receive receiver specific information, wherein the information-expected time interval is determined based on a reception time of the time-reference signal and the receiver identification value, wherein the step of operating the receiver from an off-state to an on-state during an information-expected time interval to receive receiver specific information is repeated until a time-shift difference between the information-expected time interval and an information-arrival time interval is greater than a time-shift threshold.

12. The method in accordance with claim 11, wherein the method includes
    operating the receiver from the on-state to the off-state after the information-expected time interval.

13. The method in accordance with claim 11, wherein the step of operating the receiver from an off-state to an on-state during an information-expected time interval to receive receiver specific information is repeated a plurality of instances before repeating the step of operating the receiver to detect the time-reference signal.

14. The method in accordance with claim 13, wherein the step of operating the receiver from an off-state to an on-state during an information-expected time interval to receive receiver specific information is repeated a predetermined number of instances.

15. The method in accordance with claim 13, wherein the step of operating the receiver from an off-state to an on-state during an information-expected time interval to receive receiver specific information is repeated if a signal strength during the information-expected time interval is greater than a signal-strength threshold.

* * * * *